United States Patent Office 2,995,519
Patented Aug. 8, 1961

2,995,519
PHOSPHATE ESTER HYDRAULIC FLUIDS
John J. Shatynski, Elizabeth, and Henry V. Wainright, Westfield, N.J., assignors to Celanese Corporation of America, New York, N.Y., a corporation of Delaware
No Drawing. Filed Jan. 30, 1956, Ser. No. 561,980
9 Claims. (Cl. 252—78)

This invention relates to aryl phosphates and relates more particularly to fire-resistant hydraulic fluids comprising such aryl phosphates.

The use of tricresyl phosphate and similar phosphate esters in hydraulic fluids is well known in the art. However, the viscosity of such hydraulic fluids is not high enough to enable them to be used in many of the hydraulic systems employed in industry. When it is attempted to raise the viscosity of the hydraulic fluids, for example by adding other higher molecular weight materials or by employing long chain alkyl phenols in the production of the phosphate esters, the fire-resistance or lubricating properties of the fluid are usually adversely affected.

It is therefore an object of this invention to provide a hydraulic fluid having a relatively high viscosity, i.e., a viscosity of about 250 to 2500 SUS (Saybolt Universal seconds) at 100° F., and having excellent lubricating and fire resistance properties.

Other objects of this invention will be apparent from the following detailed description and claims. In this description and claims all proportions are by weight unless otherwise indicated.

In accordance with one aspect of this invention there is produced a hydraulic fluid consisting essentially of 2-biphenylyl dicresyl phosphate or 2-biphenylyl dixylenyl phosphate, alone, or in admixture with each other or with one or more other triaryl phosphates. The 2-biphenylyl dicresyl phosphate or 2-biphenylyl dixylenyl phosphate may constitute substantially the whole of the hydraulic fluid composition, in which case the hydraulic fluid generally has a viscosity in the neighborhood of 800 to 2500 SUS at 100° F. To obtain a hydraulic fluid whose viscosity is lower, e.g. about 250 or 300 to 1000 SUS at 100° F., the 2-biphenylyl dicresyl phosphate or 2-biphenylyl dixylenyl phosphate may be mixed with a triaryl phosphate of lower viscosity such as tricresyl phosphate or the phosphate triester of a mixture of cresols, xylenols and higher alkyl phenols.

The 2-biphenylyl dicresyl phosphate or 2-biphenylyl dixylenyl phosphate of this invention may be produced by reacting about one mole of o-phenyl phenol with one mole of a suitable ester-forming phosphoric acid derivative, such as phosphorus oxychloride, other phosphoryl halides, phosphorus pentoxide or phosphorus pentachloride, and thereafter reacting the resulting product with about two moles of a cresol or a xylenol. Alternatively, there may be used a one-step method, in which a mixture of one mole of the o-phenyl phenol and two moles of the cresol or xylenol are reacted with the ester-forming phosphoric acid derivative. The latter method generally yields products of lower viscosity, as compared with the products of the two-step method, described previously. The cresol may be substantially pure, e.g., meta-para cresol, or it may be in the form of cresylic acid, while the xylenol may have small amounts of other phenolic materials, such as cresols and higher alkyl phenols, mixed therewith. For best results, the total amount of hydroxy aromatic compounds present in the reaction mixture is slightly in excess, e.g., 5 to 8% in excess, of the stoichiometric amount required to react with the ester-forming phosphoric acid derivative, and the reaction is carried out by heating to a maximum temperature of about 200° C., e.g., 150–200° C, in the presence of a small amount of metal halide catalyst such as aluminum chloride, magnesium chloride, etc., while any volatile byproduct of the reaction, e.g., hydrogen chloride, is removed. Thereafter, the reaction product may be distilled or stripped by heating under vacuum to remove any unreacted hydroxy aromatic compounds and may be purified by extracting it with weak aqueous alkali and then treating it with an oxidizing agent to remove the last traces of oxidizable impurities.

As mentioned above, the 2-biphenylyl dicresyl phosphate or 2-biphenylyl dixylenyl phosphate of this invention may be blended with a phosphate triester of a mixture of cresols, xylenols and higher alkyl phenols. One very suitable phosphate triester of this type is made by the esterification, with an ester-forming phosphoric acid derivative such as phosphorus oxychloride, of a mixture of hydroxyaromatic compounds containing 11 to 17%, preferably 14%, by weight of meta- and para-cresols, 65 to 80%, preferably 75%, by weight of xylenols, and 8 to 12%, preferably 10%, by weight of higher alkyl phenols containing 3 to 6 carbon atoms in alkyl side chains substituted on the benzene ring, e.g., propyl phenol, methyl ethyl phenol, or butyl phenol. The aforesaid mixture of hydroxyaromatic compounds may also contain a small proportion, not over 3%, and preferably 1% or less, by weight of o-cresol.

The hydraulic fluids of this invention may also have incorporated therewith minor amounts of the usual additives, such as rust inhibitors or agents for improving their viscosity index, where desired.

The hydraulic fluids of this invention are highly stable to hydrolysis, are non-foaming and show substantially no tendency to ignite or burn even when subjected to extremely high temperatures in the presence of air. In addition, they are extremely effective lubricants.

Because of their superior properties, the phosphate esters of this invention are suitable for a wide variety of uses. They are excellent for use as the working fluid in hydraulic systems, particularly where there is the danger of fire occurring in the event of a leak or a break in the systems, for example, the hydraulic systems of die casting machines, hydraulic presses, extrusion presses, etc. These phosphate esters also possess outstanding lubricative properties so that they may be used to lubricate parts where ordinary lubricant materials, such as mineral oils, are unsuitable owing to their flammability, volatility, susceptibility to oxidation, or the like. The lubricative properties of the phosphate esters of this invention also enhance their suitability for use in hydraulic systems since they will lubricate all the parts with which they come into contact and prevent excessive wear of the same. Other non-flammable fluids, such as water, that have been suggested for use in hydraulic systems do not act as effective lubricants so that when they are employed in such systems, excessive wear of the moving parts therein frequently occurs. Because of their outstanding properties, these phosphate esters are particularly suitable for use in hydraulic systems where the operating conditions are severe and in high pressure systems employing pumps with antifriction bearings. They may also be used to lubricate air compressors where they reduce the hazard of explosions and fires, while affording proper lubrication to the equipment.

The following examples are given to illustrate this invention further.

*Example 1*

One mole (170 parts) of o-phenyl phenol is mixed with 2 moles (216 parts) of coal tar cresylic acid, ester grade (Koppers EG grade containing about 1% of phenol, 4% of o-cresol, 85% of m, p-cresol and 10% of xylenols) and 0.98 mole (150 parts) of phosphorus oxychloride in a reaction vessel. 1.5 parts of magnesium chloride is added and the mixture is slowly heated up to a temperature of 170° C. over a period of about 8 hours, while hydrogen chloride is steadily evolved. When, at the end of this period, the evolution of HCl is observed to cease, a condenser is attached to the reaction vessel and the vessel is evacuated until its pressure is 25 mm. of mercury absolute. The temperature in the evacuated reaction vessel is gradually raised to a maximum of 320° C. while about 25 parts of unreacted phenolic material is removed under said vacuum. Thereafter the resulting stripped residue is cooled while still under vacuum to a temperature below 150° C. and then washed with an equal volume of a 1½% aqueous sodium hydroxide solution for 2 minutes, allowed to separate from the washing solution for 15 minutes, then washed until its pH is 2 with aqueous phosphoric acid, washed 3 times more with a 1½% sodium hydroxide solution, then washed with water containing a small amount of phosphoric acid until neutral, all washes taking place at 80° C. Thereafter the residue is washed further with dilute aqueous potassium permanganate, bleached with sodium bisulfite, dehydrated under vacuum and filtered.

The resulting 2-biphenylyl dicresyl phosphate is a liquid having a viscosity of 1025 SUS at 100° F., a specific gravity at 60° F. of 1.184, a flash point of 570° F. (ASTM-D92-46), a fire point of above 760° F. (ASTM D92-46) and an autogenous ignition temperature of 1175° F. (ASTM D286-30). When its lubricating properties are tested by the Shell 4-Ball Wear test, described beginning at page 35 of "Lubrication Engineering" for August 1945, using a test run of 1 hour, a temperature of 167° F., 850 r.p.m., steel against steel contacting surfaces and a load of 1 kilogram, the scar diameter is 0.20 mm.

The 2-biphenylyl dicresyl phosphate of this example is also subjected to the hot manifold test (described in the Aeronautical Material Specification 3150B4.9.4, published by the Society of Automotive Engineers) in which the liquid to be tested is dripped onto a clean heated tube, the test being modified, to prevent the liquid from running off the tube too rapidly, by applying a clean coating of a silicone paste to the tube in each experiment before the liquid is dripped onto the tube. When so tested, the 2-biphenylyl dicresyl phosphate of this example does not burn when dripped on a tube having a temperature above 1300° F.

*Example II*

Example I is repeated except that the cresylic acid is a petroleum cresylic acid (Pitt-Sonsol M.P. grade containing about 2% of phenol, 5% of o-cresol, 80% of m,p-cresol, 8% of xylenols, and 5% of higher alkyl phenols) and the o-phenyl phenol is first mixed with the phosphorus oxychloride and the magnesium chloride catalyst and reacted to completion in about 5 hours with the temperature rising to 120° C. The cresylic acid is then added and the reaction is continued for 8 more hours until it is completed at a temperature of 160° C. In this case, in the evacuation and stripping step a temperature of 280° C. is sufficient for stripping off the unreacted phenolic material.

The resulting 2-biphenylyl dicresyl phosphate is a liquid having a viscosity of 1138 SUS at 100° F., a specific gravity at 60° F. of 1.180, a flash point of 550° F., a fire point of above 760° F. and an autogenous ignition temperature of 1195° F. In the hot manifold test, it does not burn below 1350° F. When it is employed in the wear test set out in Example I, the scar diameter is 0.16 mm.

*Example III*

Example II is repeated except that there is substituted for the cresylic acid a commercial mixed xylenol (U.S. Steel-Grade No. 6) having a specific gravity 20/20 of 1.017 and a boiling range of about 220 to 230° C.

The resulting 2-biphenylyl dixylenyl phosphat is a liquid having a viscosity of 2116 SUS at 100° F., a specific gravity at 60° F. of 1.175, a flash point of 580° F., a fire point of 760° F. and an autogenous ignition temperature of 1165° F. In the hot manifold test, it does not burn below 1370° F. When it is used in the wear test set out in Example I, the scar diameter is 0.23 mm.

*Example IV*

22 parts of the product of Example I are blended with 78 parts of a phosphate triester of a mixture containing 14% of meta- and para-cresols, 75% of xylenols, 10% of higher alkyl phenols containing 3 to 6 carbon atoms in alkyl side chains substituted on the benzene ring, including propyl phenol, methyl ethyl phenol, and butyl phenol, and 1% of o-cresol, said phosphate triester having a viscosity of 221 SUS at 100° F. The resulting blend has a viscosity of 301 SUS at 100° F. and an autogenous ignition temperature of 1170° F. In the hot manifold test, it does not burn below 1330° F.

*Example V*

16 parts of the product of Example II are blended with 84 parts of the phosphate triester described in Example IV. The resulting blend has a viscosity of 302 SUS at 100° F., a flash point of 515° F., a fire point of 665° F., and an autogenous ignition temperature of 1160° F. In the hot manifold test it does not burn below 1350° F. When it is used in the Shell 4-Ball Wear test the scar has a diameter of 0.17 mm.

*Example VI*

48 parts of the 2-biphenylyl dixylenyl phosphate of Example III are mixed with 52 parts of the phosphate triester described in Example IV. The resulting blend has a viscosity of 569 SUS at 100° F., a flash point of 515° F., a fire point of 730° F. and an autogenous ignition temperature of 1165° F. In the hot manifold test it does not burn below 1360° F. When it is used in the Shell 4-Ball Wear test the scar diameter is 0.18 mm.

It is to be understood that the foregoing detailed description is merely given by way of illustration and that many variations may be made therein without departing from the spirit of our invention.

Having described our invention, what we desire to secure by Letters Patent is:

1. A fire-resistant hydraulic fluid having a viscosity of about 250 to 1000 SUS at 100° F. and consisting essentially of triaryl esters of phosphoric acid and comprising a 2-biphenylyl ester selected from the group consisting of 2-biphenylyl dicresyl phosphate and 2-biphenylyl dixylenyl phosphate blended with a phosphate triester of a mixture containing meta- and para-cresols, xylenols and alkyl phenols containing 3 to 6 carbon atoms in alkyl side chains.

2. A fire-resistant hydraulic fluid having a viscosity of about 250 to 2500 SUS at 100° F. and consisting essentially of triaryl esters of phosphoric acid and comprising a 2-biphenylyl ester selected from the group consisting of 2-biphenylyl dicresyl phosphate and 2-biphenylyl dixylenyl phosphate blended with a phosphate triester of a mixture containing 11 to 17% of meta- and para-cresols, 65 to 80% of xylenols and 8 to 12% of alkyl phenols containing 3 to 6 carbon atoms in alkyl side chains.

3. A fire-resistant hydraulic fluid having a viscosity of about 800 to 2500 SUS at 100° F. and consisting essentially of 2-biphenylyl dixylenyl phosphate.

4. A hydraulic system containing as the operative fluid a fire-resistant liquid having a viscosity of about 250 to 1000 SUS at 100° F. and consisting essentially of triaryl esters of phosphoric acid and comprising a 2-biphenylyl ester selected from the group consisting of 2-biphenylyl dicresyl phosphate and 2-biphenylyl dixylenyl phosphate blended with a phosphate triester of a mixture containing meta- and para-cresols, xylenols and alkyl phenols containing 3 to 6 carbon atoms in alkyl side chains.

5. A hydraulic system containing as the operative fluid a fire-resistant liquid having a viscosity of about 250 to 2500 SUS at 100° F. and consisting essentially of triaryl ester of phosphoric acid and comprising a 2-biphenylyl ester selected from the group consisting of 2-biphenylyl dicresyl phosphate and 2-biphenylyl dixylenyl phosphate blended with a phosphate triester of a mixture containing 11 to 17% of meta- and para-cresols, 65 to 80% of xylenols and 8 to 12% of alkyl phenols containing 3 to 6 carbon atoms in alkyl side chains.

6. A hydraulic system containing as the operative fluid a fire-resistant liquid having a viscosity of about 800 to 2500 SUS at 100° F. and consisting essentially of a 2-biphenylyl ester selected from the group consisting of 2-biphenylyl dicresyl phosphate and 2-biphenylyl dixylenyl phosphate.

7. In the method of operating a hydraulic pressure device wherein a displacing force is transmitted to a displaceable member by means of a hydraulic fluid, the improvement which comprises employing as said hydraulic fluid a fire-resistant liquid having a viscosity of about 250 to 1000 SUS at 100° F. and consisting essentially of triaryl esters of phosphoric acid and comprising a 2-biphenylyl ester selected from the group consisting of 2-biphenylyl dicresyl phosphate and 2-biphenylyl dixylenyl phosphate blended with a phosphate triester of a mixture containing meta- and para-cresols, xylenols and alkyl phenols containing 3 to 6 carbon atoms in alkyl side chains.

8. In the method of operating a hydraulic pressure device wherein a displacing force is transmitted to a displaceable member by means of a hydraulic fluid, the improvement which comprises employing as said hydraulic fluid a fire-resistant liquid having a viscosity of about 250 to 2500 SUS at 100° F. and consisting essentially of triaryl ester of phosphoric acid and comprising a 2-biphenylyl ester selected from the group consisting of 2-biphenylyl dicresyl phosphate and 2-biphenylyl dixylenyl phosphate blended with a phosphate triester of a mixture containing 11 to 17% of meta- and para-cresols, 65 to 80% of xylenols and 8 to 12% of alkyl phenols containing 3 to 6 carbon atoms in alkyl side chains.

9. In the method of operating a hydraulic pressure device wherein a displacing force is transmitted to a displaceable member by means of a hydraulic fluid, the improvement which comprises employing as said hydraulic fluid a fire-resistant liquid having a viscosity of about 800 to 2500 SUS at 100° F. and consisting essentially of a 2-biphenylyl ester selected from the group consisting of 2-biphenylyl dicresyl phosphate and 2-biphenylyl dixylenyl phosphate.

References Cited in the file of this patent

UNITED STATES PATENTS

| | | |
|---|---|---|
| 1,858,659 | Britton | May 17, 1932 |
| 2,033,918 | Britton | Mar. 17, 1936 |
| 2,117,290 | Britton et al. | May 17, 1938 |
| 2,117,291 | Britton et al. | May 17, 1938 |
| 2,133,311 | Shuman | Oct. 18, 1938 |
| 2,596,140 | Gamrath et al. | May 13, 1952 |
| 2,596,141 | Gamrath et al. | May 13, 1952 |
| 2,636,861 | Watson | Apr. 28, 1953 |